United States Patent [19]

Dixon

[11] Patent Number: 5,386,112

[45] Date of Patent: Jan. 31, 1995

[54] APPARATUS AND METHOD FOR TRANSMITTED-LIGHT AND REFLECTED-LIGHT IMAGING

[76] Inventor: Arthur E. Dixon, Dept. of Physics, U. of Waterloo, Waterloo, Ontario, Canada, N2L 3G1

[21] Appl. No.: 995,989

[22] Filed: Dec. 23, 1992

[30] Foreign Application Priority Data

Jun. 29, 1990 [GB] United Kingdom ............... 9014570
Jun. 28, 1991 [WO] 06281991 ............ PCT/CA91/00243
Jun. 28, 1991 [WO] WIPO ................ PCT/CA91/00243

[51] Int. Cl.$^6$ ............................................... H01J 3/14
[52] U.S. Cl. ...................................... 250/234; 359/368
[58] Field of Search ..................... 250/201.3, 216, 234; 359/368, 372

[56] References Cited

U.S. PATENT DOCUMENTS

| | | | |
|---|---|---|---|
| 4,827,125 | 5/1989 | Goldstein | 250/234 |
| 4,863,226 | 9/1989 | Houpt et al. | 250/566 |
| 4,893,008 | 1/1990 | Horikawa | 250/234 |
| 5,059,010 | 10/1991 | Yomoda | 359/372 |

Primary Examiner—Edward K. Look
Assistant Examiner—James A. Larson
Attorney, Agent, or Firm—Daryl W. Schnurr

[57] ABSTRACT

A new scanning optical microscope or mapping system for transmission, reflection and luminescence imaging is disclosed. A transmission arm collects light transmitted through the specimen and injects it back into the optical path of the microscope parallel with and coaxial with the reflected light beam returning from the specimen, so both transmitted and reflected light beams are de-scanned by the same scan optics on their way back to the same detector. Since light travels around the transmission arm in both directions, this microscope forms images of the specimen from either the top or the bottom and in either reflected light or transmitted light, and all four of these imaging modes can be selected separately. Embodiments for use in fluorescence and photoluminescence imaging are also disclosed.

24 Claims, 9 Drawing Sheets

APPARATUS AND METHOD FOR TRANSMITTED-LIGHT AND REFLECTED-LIGHT IMAGING

TECHNICAL FIELD

This invention relates to the field of scanning optical microscopy and mapping systems, and relates generally to a method and apparatus for forming a confocal or non-confocal image of a specimen using transmitted and/or reflected light. The invention also relates to the fields of fluorescence and photoluminescence microscopy and mapping.

BACKGROUND OF THE INVENTION

There is a broad class of scanning microscopes and mapping systems in which a light source is focused to a point on a specimen, and the light reflected (or emitted) from that point is measured by a detector. An image of the specimen is recorded by scanning the illuminated point across the specimen in a raster scan (scanning beam system), or by moving the specimen in a raster scan under a stationary beam (scanning stage system). Scanning stage microscopes are often used when the specimen is large (for example, when an image is required of a whole semiconductor wafer).

A simple prior art confocal scanning stage laser microscope is shown in FIG. 1. In this implementation the beam from laser 102 is focused by lens 104 onto pinhole 106, and the light passing through pinhole 106 passes through beamsplitter 108 and is focused by objective lens 110 to a focal spot 111 at the surface of (or inside) specimen 112. For best resolution, focal spot 111 should be diffraction limited. Light reflected from or emitted by the specimen at focal spot 111 is collected by objective lens 110, and part of this light is reflected by beamsplitter 108 to be focused at detector pinhole 114. Pinhole 106 and detector pinhole 114 are confocal with focal spot 111. Light passing through detector pinhole 114 is collected by detector 116. Reflected light from focal spot 111 at specimen 112 passes through detector pinhole 114, but light from any other point on the specimen runs into the edges of detector pinhole 114, and is not collected. This gives the confocal microscope increased resolution over a non-confocal microscope, and since detector pinhole 114 rejects light that does not come from the focal plane, gives the confocal microscope its optical slicing ability, which allows it to record true three dimensional images. The microscope shown in FIG. 1 uses scanning stages 118 to move the specimen under the stationary laser beam to record the image, but configurations which scan the beam instead of scanning the specimen are also known. Microscopes using infinity-corrected optics are also common, both in scanning-stage and scanning-beam configurations. These configurations are described in J. Pawley, "The Handbook of Biological Confocal Microscopy" IMR Press, Madison Wis. 53706 (1989) In addition, it is known that detector pinhole 114 and detector 116 behind it (which together comprise a confocal detector) can be replaced with a small detector whose area is the same as that of detector pinhole 114.

Scanning stage microscopes have several disadvantages over scanning beam microscopes. The main disadvantage is the increased time required to acquire an image, because scanning the specimen under a fixed beam is inherently slower than scanning the beam. Rapid scanning of the specimen and stages can also cause vibrations in the microscope and/or in the specimen itself which can cause blurring in the acquired image, an additional disadvantage. One advantage of scanning stage microscopes is their ability to perform very large scans with high spatial resolution. One example of such an application is the use of a non-confocal scanning stage microscope for photoluminescence mapping of semiconductor wafers as described by Moore et al, "A Spatially Resolved Spectrally Resolved Photoluminescence Mapping System", Journal of Crystal Growth 103, 21–27 (1990). When scanning optical microscopes are used with large specimens like semiconductor wafers, they are often referred to as "mapping systems" or "mappers".

A prior-art infinity-corrected scanning beam confocal microscope is shown in perspective in FIG. 2. Light beam 203 from light source 202 is focused on pinhole 208 by lens 206. The expanding beam exiting pinhole 208 is focused to a parallel beam by lens 210. (Lens 206, pinhole 208 and lens 210 constitute a spatial filter and beam expander.) The parallel beam passes through beamsplitter 212 and is deflected in the x-y plane by first scanning mirror 214, which rotates about an axis parallel to the z-direction. Lenses 216 and 218 of focal length $f_2$ return the deflected light beam to the center of second scanning mirror 220, which rotates about an axis parallel to the x-direction and imparts a deflection in the y-z plane. Lenses 222 and 224 of focal length $f_3$ return the deflected beam (which now has been deflected by both scanning mirrors) to enter objective lens 226 centered on its entrance pupil. Objective lens 226 focuses the light to a focal spot 227 (which for best resolution should be a diffraction-limited spot) at the surface of or inside specimen 228. The focus position is set by focus stage 230, which moves in the z-direction. Light reflected back from or emitted by the tiny volume of the specimen at focal spot 227 is collected by objective lens 226 and passes back through the scan system of the microscope. Part of this returning beam is reflected by beamsplitter 212 towards lens 232. Lens 232 focuses the light onto detector pinhole 234. Light originating from focal spot 227 in specimen 228 passes through detector pinhole 234 and is detected by detector 236, light from any other point in specimen 228 hits the metal edges around detector pinhole 234, and is not detected. As the scanning mirrors 214 and 220 move focal spot 227 across specimen 228, an image is recorded of features of the specimen that are in the focal plane of objective lens 226. If the specimen position is changed by moving it toward or away from the objective lens, an image from a different slice through the specimen is recorded.

Several other prior art embodiments of the scanning beam confocal reflected light microscope exist, including microscopes using a single mirror that can be scanned about two perpendicular axes, and microscopes using acousto-optic deflectors as described by Pieter Houpt et al in U.S. Pat. No. 4,863,226.

Another prior art embodiment of a confocal scanning-beam laser microscope uses an acousto-optic deflector to scan the beam in the fast scan direction and a scanning mirror to scan it in the slow scan direction. In this embodiment, the reflected or fluorescence light returning from the specimen is descanned by the mirror in the slow scan direction, and is then reflected toward a confocal detector comprising a linear detector array so no descanning is required in the fast direction. This has the advantage of allowing very high speed scans without having to pass the reflected or fluorescence light back through the acousto-optic deflector, which would considerably reduce the intensity of the light reaching the detector.

Yet another prior-art embodiment of a confocal scanning-beam optical microscope is the class of microscopes known as Nipkow Disk microscopes. The microscopes in this class were described by Gordon Kino in "Efficiency in Nipkow Disk Microscopes" in "The Handbook of Biological Confocal Microscopy", p. 93–99 (IMR Press, Madison, Wis. 53706, edited by J. Pawley). These microscopes are different from the microscopes already described mainly in that a large number of incoming scanning beams are focused on the specimen simultaneously, and reflected or fluorescent light beams from these focused spots are detected simultaneously.

Scanning beam microscopes that are not infinity corrected have also been made. All of these microscopes are often used for fluorescence measurements (see J. Pawley, referred to earlier).

A prior art scanning stage reflection and transmission confocal microscope is shown in FIG. 3. In this microscope transmitted light is collected by a second objective lens 320 placed beneath specimen 112, confocal with the first objective lens 110. Transmitted light from the focal point is collected by second objective lens 320, passes through pinhole 322 in front of transmitted-light detector 324, whereas light from other points in specimen 112 hits the edges of pinhole 322 and does not reach detector 324. The sample is translated in a raster scan relative to the fixed beam. Thus this microscope performs optical image slicing in transmission as well as in reflection. A scanning stage transmission confocal microscope was described by G. J. Brakenhoff, "Imaging Modes in Confocal Scanning Light Microscopy", Journal of Microscopy 117, 233–242 (1979).

The scanning stage transmission microscope shown in FIG. 3 has all of the disadvantages of scanning stage microscopes listed earlier, but this microscope has the advantage of being able to form images in transmission. One disadvantage is that the resolution of both reflection and transmission images becomes progressively poorer as the microscope is focused further beneath the top surface of the specimen. This is caused by spherical abberation in the specimen.

Scanning beam transmission confocal microscopes have been thought to be impractical (see D. Goodman, "Confocal Microscopy", notes from a course at SPIE's 1989 Symposium on Microlithography, San Jose, Calif. (1989)), since they require precise synchronization of two scan systems, one in the source arm of the microscope, and one in the detector arm, so the source pinhole and detector pinhole are imaged at the same point on the specimen as the scan proceeds. However, one design of a transmission scanning beam microscope has been described in the literature by S. Goldstein, "A No-Moving-Parts Video Rate Laser Beam Scanning Type 2 Confocal Reflected/Transmission Microscope", Journal of Microscopy 153, RP1–RP2 (1989) and in U.S. Pat. No. 4,827,125. Goldstein does not descan the transmitted beam; instead his invention uses an Image Dissector Tube to scan the detector pinhole in synchronism with the scanning transmitted (or reflected) beam. Precise synchronization is difficult and requires sophisticated electronics, and different optical paths must be used for reflected-light and transmitted-light imaging, requiring two complete detector systems. The only practical detector that has been used in this microscope is the image dissector tube, severely limiting the choice of detectors for different applications.

The prior art confocal scanning beam microscopes described herein and in the reference literature are used generally reflected-light and fluorescence or photoluminescence imaging. These microscopes have several limitations. First, the image-slicing ability of these confocal microscopes enables them to record three-dimensional images, but viewed from one side of the specimen only. Second, when scanning specimens more than a few microns thick, spherical abberation degrades the image as the beam penetrates deeper into the specimen, and the degradation increases with depth. This is true for both reflected-light and fluorescence or photoluminescence imaging. Third, biological specimens are often only weak reflectors, requiring either high levels of illumination or frame averaging to build up an image. Fourth, when fluorescence or photoluminescence measurements are performed using these microscopes, the focus of the microscope may be at a slightly different position for the incoming illumination than it is for the photoluminescence or fluorescence wavelengths emitted by the specimen, since photoluminescence or fluorescence occurs at wavelengths that are different from the exciting wavelength, and the focal length of a microscope objective varies slightly with wavelength.

It is an object of the present invention to provide a practical scanning beam confocal microscope that will record confocal images in both transmission and reflection.

It is another object of this invention to provide confocal images from both sides of a specimen, in both transmission and reflection, which allows the operator to form a reflected-light image of both the top and bottom of an opaque specimen, thus allowing the microscope to additionally record the bottom half of a three-dimensional image of an opaque specimen. In addition., this can reduce the effect of spherical abberation by allowing the operator to illuminate the specimen with a beam that impinges on the specimen from the side closest to the focal plane. Thus, a beam from the top can be chosen when imaging the top half of a specimen, and one from the bottom when imaging the bottom half.

It is yet a further object of this invention to provide a scanning-beam confocal photoluminescence or fluorescence microscope in which the incoming illumination is focused by one objective lens and the fluorescence or photoluminescence emitted by the specimen is collected by the second objective lens, which now can be placed at the proper focal distance to collect light at the fluorescence or photoluminescence wavelength emitted from the illuminated spot in the specimen.

It is yet a further object of this invention to provide a confocal scanning beam laser microscope or mapping system, that allows the operator to choose any of four operating modes for the microscope: transmission with illumination from the top of the specimen, transmission with illumination from the bottom of the specimen, reflection from the top, and reflection from the bottom, in addition to being able to use the microscope for fluorescence or photoluminescence imaging.

It is a further object of this invention to provide a confocal scanning stage microscope, or one using a scanning stage in one direction and a scanning beam in the other, that will provide any of the capabilities described in the objects stated above.

DESCRIPTION OF THE INVENTION

The present invention is a practical confocal scanning microscope that can be used for reflected-light and transmitted-light imaging and for fluorescence or photoluminescence imaging. Both scanning stage and scanning beam versions will be described.

Figure 4:
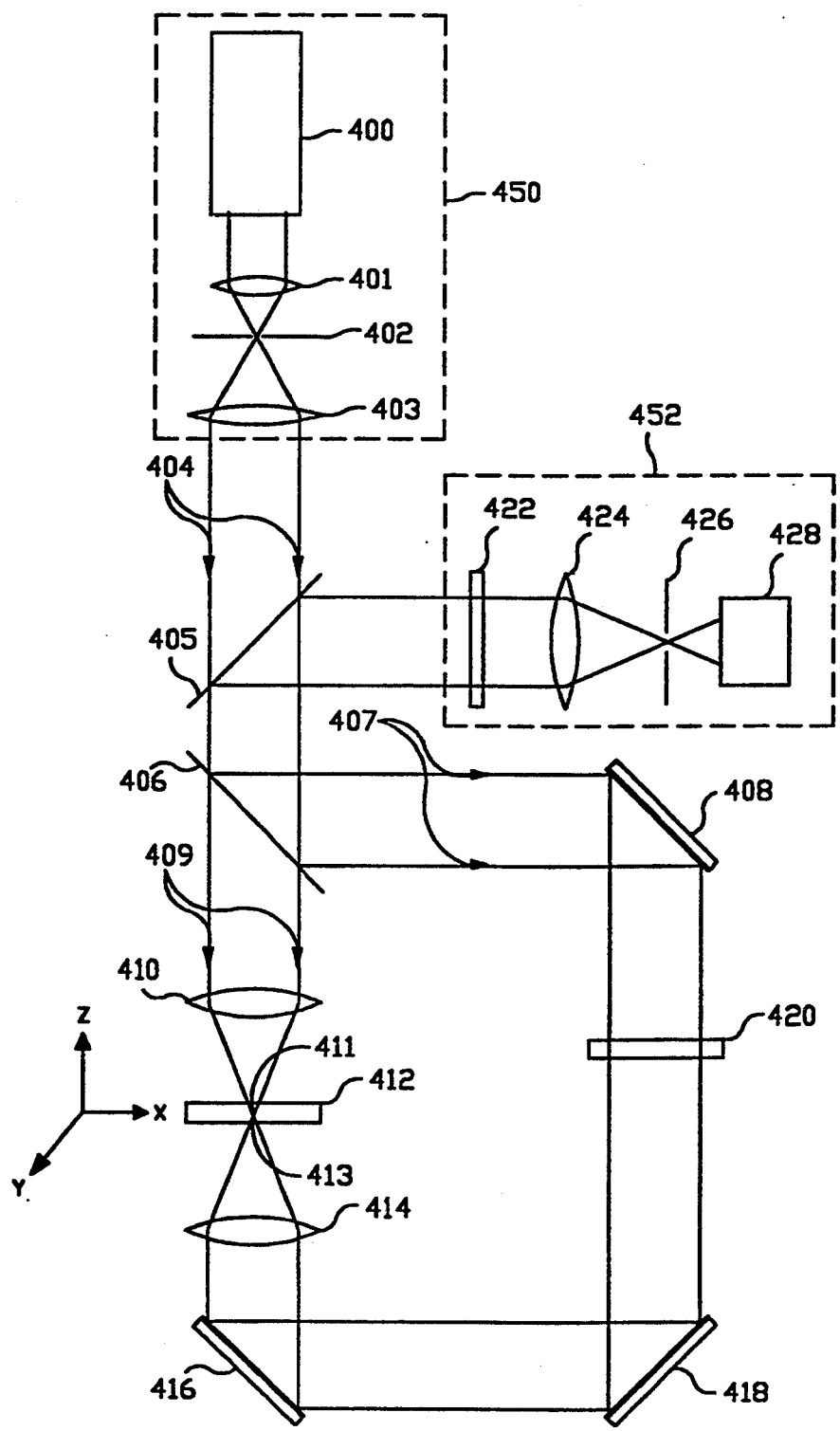
FIG. 4 is a simplified side view of one embodiment of the present invention, an infinity-corrected confocal scanning stage reflection and transmission optical microscope.

FIG. 4 shows one embodiment of the invention, a transmitted-light and reflected-light confocal microscope using a pair of scanning stages to move the specimen in a raster scan in x and y directions under the stationary laser beam. A third stage moves the specimen in the z (axial) direction to change the focus position with respect to the specimen. (These stages are not shown in the diagram and this arrangement of scanning stages and focusing stage is known in the art). In this embodiment of the invention, incoming parallel light beam 404 of polarized light (from light source 450 comprising laser 400 (or other polarized light source) and spatial filter comprised of lens 401, pinhole 402 and lens 403) passes through first beamsplitter 405 and impinges on the second beamsplitter 406. (Part of the light beam, reflected to the left by first beamsplitter 405, is lost). At second beamsplitter 406, part of the the light beam (light beam 407) is reflected toward mirror 408 and part is transmitted (light beam 409) toward first objective lens 410.

Light beam 409 entering first objective lens 410 is focused to a focal spot 411 at the focal point of that lens at the surface of, or inside, specimen 412. Light transmitted through the specimen is collected by second objective lens 414 (whose focal spot 413 is at the same position as focal spot 411 of first objective lens 410), is reflected through 90 degrees by mirror 416 and through 90 degrees by mirror 418, passes through half-wave plate 420, which rotates the polarization of the light beam by 90 degrees, is reflected through 90 degrees by mirror 408 and partially reflected by beamsplitter 406 toward beamsplitter 405. It is then partially reflected by beamsplitter 405 and enters the detection arm 452 of the microscope. It then passes through analyzer 422 and is focused by focusing lens 424 to pass through detector pinhole 426 to reach detector 428. Detector pinhole 426 is confocal with the focal spot of the two objective lenses 410 and 414, and rejects light coming from all points in specimen 412 other than the coincident focal spots 411 and 413 of objective lenses 410 and 414.

Light reflected by beamsplitter 406 toward mirror 408 (light beam 407) is reflected through 90 degrees by mirror 408, passes through half-wave plate 420 where its polarization is rotated by 90 degrees, is reflected through 90 degrees by mirror 418 and through a further 90 degrees by mirror 416, and is focused to focal spot 413 (coincident with focal spot 411) by objective lens 414. Light transmitted upward through specimen 412 is collected by objective lens 410, then is partially reflected and partially transmitted by beamsplitter 406 (the part reflected to the left is lost). The transmitted portion travels back up the microscope, and is partially reflected by beamsplitter 405 to enter detection arm 452. The other part of the light beam is transmitted through beamsplitter 405 and is lost. In detection arm 452 the light beam passes through analyzer 422, and is focused by lens 424 to pass through pinhole 426 to reach detector 428. Note that both light beam 409, which is transmitted through specimen 412 from above, and light beam 407, which is transmitted through specimen 412 from below, pass through half-wave plate 420 once before reaching detection arm 452, and have the same polarization as they enter analyzer 422.

At the same time, light reflected by specimen 412 also travels back to detector 428. When light beam 409 impinges on specimen 412 from above, light reflected by specimen 412 is collected by objective lens 410, and travels as a parallel light beam back to beamsplitter 405, where it is partially reflected to enter detection arm 452. Light beam 407 passes through half-wave plate 420 before entering specimen 412 from below, and light reflected from specimen 412 passes back through half-wave plate 420 again on its way back to detection arm 452. Thus the part of light beam 407 reflected back from specimen 412 passed through half-wave plate 420 twice as it traveled through the microscope, so it has the same polarization as the reflected-light portion of light beam 409 when the two beams enter detection arm 452, but is polarized at 90 degrees to the polarization of the two transmitted-light beams when they enter detection arm 452. Analyzer 422 can be rotated to select either light transmitted by specimen 412 or light reflected from specimen 412. Since the best resolution is achieved when focal spots 411 and 413 are as small as possible, a good choice for objective lenses 410 and is a pair of identical high quality infinity-corrected microscope objectives. The optical assembly comprising second objective lens 414, mirrors 416, 418, and 408, beamsplitter 406 and half-wave plate 420 is called the transmission arm of the microscope.

When the specimen thickness changes, the relative positions of objective lenses 410 and 414 must be changed slightly so they will remain confocal. This can be accomplished by moving objective lens 414 up or down while observing the signal from detector 428 with analyzer 422 set to select transmitted light. There will be a maximum in the detected signal when objective lenses 410 and 414 are confocal.

This microscope has several advantages over the prior art. By rotating analyzer 422, either reflected or transmitted light can be detected by the same detector. In addition, the microscope detects light reflected from both the top and bottom of a specimen, thus forming a confocal image which contains reflected-light information from both the top and bottom of the specimen.

The microscope can also be used for fluorescence or photoluminescence imaging, which does not require a polarized light source. One possible implementation would be to replace beamsplitter 405 with a dichroic beamsplitter that transmits the source wavelength, but reflects the longer fluorescence or photoluminescence wavelengths. In this implementation, fluorescent or photoluminescent light from specimen 412 is reflected by beamsplitter 405 to enter the detection arm 452. Since the fluorescent or photoluminescent light is not polarized, analyzer 422 can be removed. All of the photoluminescence or fluorescence wavelengths would then be detected simultaneously. Spectrally-resolved detection systems can be implemented if measurement of a complete spectrum is required.

A second possible implementation of the microscope for fluorescence or photoluminescence imaging can be accomplished by replacing beamsplitter 406 with a dichroic beamsplitter. If a dichroic beamsplitter is chosen that transmits the source wavelength and reflects the longer fluorescence or photoluminescence wavelengths, then second objective lens 414 can be focused at the proper distance to collect light at the longer fluorescence or photoluminescence wavelength of interest, while first objective lens 410 is focused at the correct distance for the source wavelength. In this embodiment light goes around the transmission arm in only one direction. This method can also be used with the scanning beam embodiments described later. The illumination source is substantially monochromatic, a rejection filter at the wavelength of the illumination source can be placed at the entrance of a detection arm, whereby transmitted and reflected light beams are blocked from the confocal detector. In this embodiment, the light detected by the confocal detector is substantially due to fluorescence or photoluminescence emission from the specimen at the position of said illuminated spot. Further, where the beamsplitter in the transmission arm is a dichroic beamsplitter, that passes light at the source wavelength and reflects light of longer wavelengths, and where the second microscope objective is focused at the correct focal distance for the longer photoluminescence or fluorescence wavelengths, a rejection filter at the wavelength of said illumination source can be placed at the entrance of a detection arm, whereby light having the same wavelength as the source is blocked from said confocal detector. In this embodiment, true confocal imagining of the longer photoluminescence or fluorescence wavelengths achieved.

Figure 5:
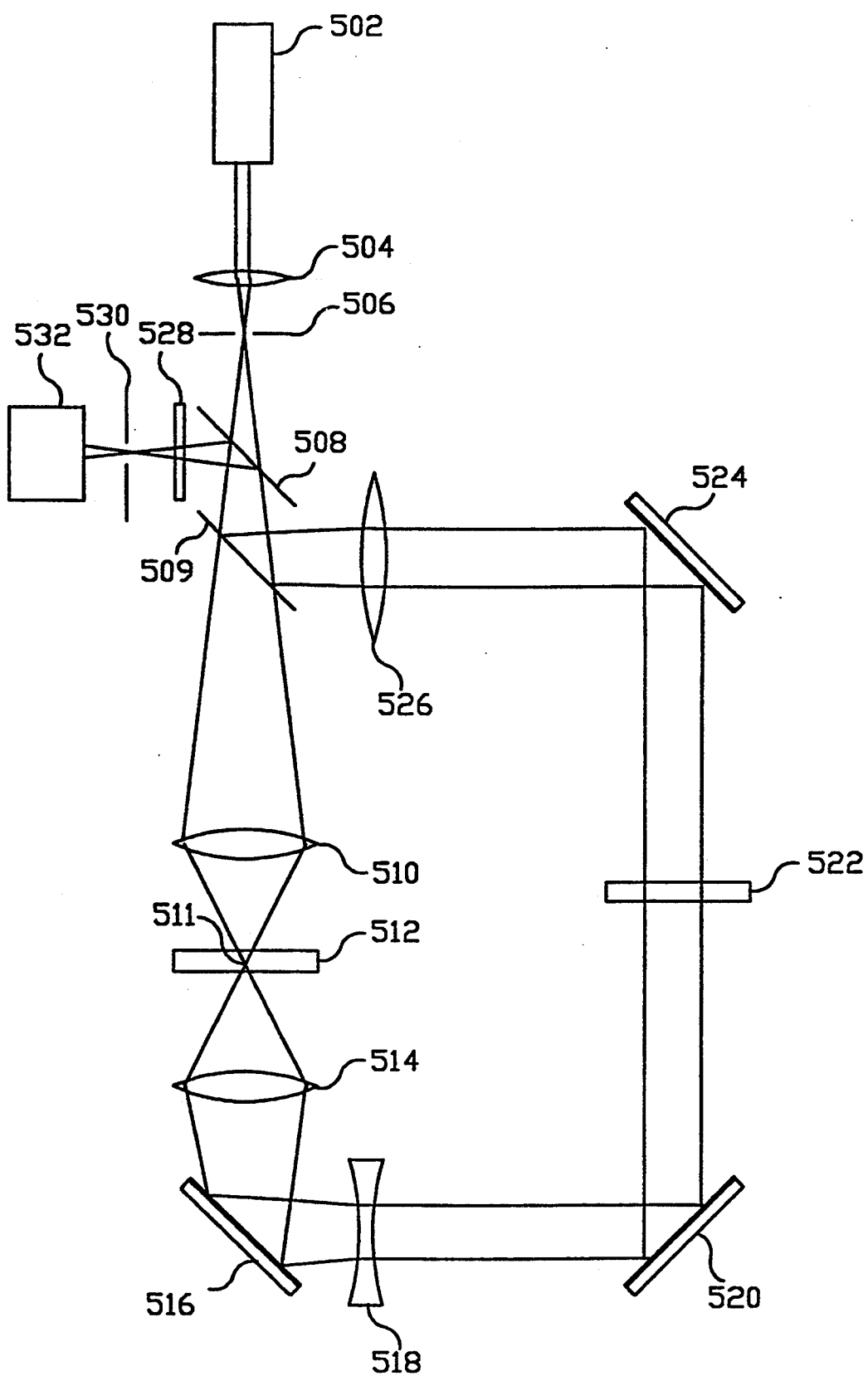
FIG. 5 is a simplified side view of another embodiment of the present invention, a non-infinity-corrected confocal scanning stage reflection and transmission microscope.

An additional embodiment of the invention is shown in FIG. 5, where a similar transmission arm is implemented in a non-infinity-corrected microscope. In this particular embodiment, lenses 518 and 526 are chosen to provide parallel beams for the optical components (mirror 520, analyzer 522, and mirror 524) that steer the beams around the specimen. Beamsplitter 509 performs the same function as beamsplitter 406 in the microscope described in FIG. 4, and beamsplitter 508 directs light returning from the sample into the detection arm of the microscope. In this embodiment an additional lens is not required to focus the returning beam onto pinhole 530.

Figure 6:
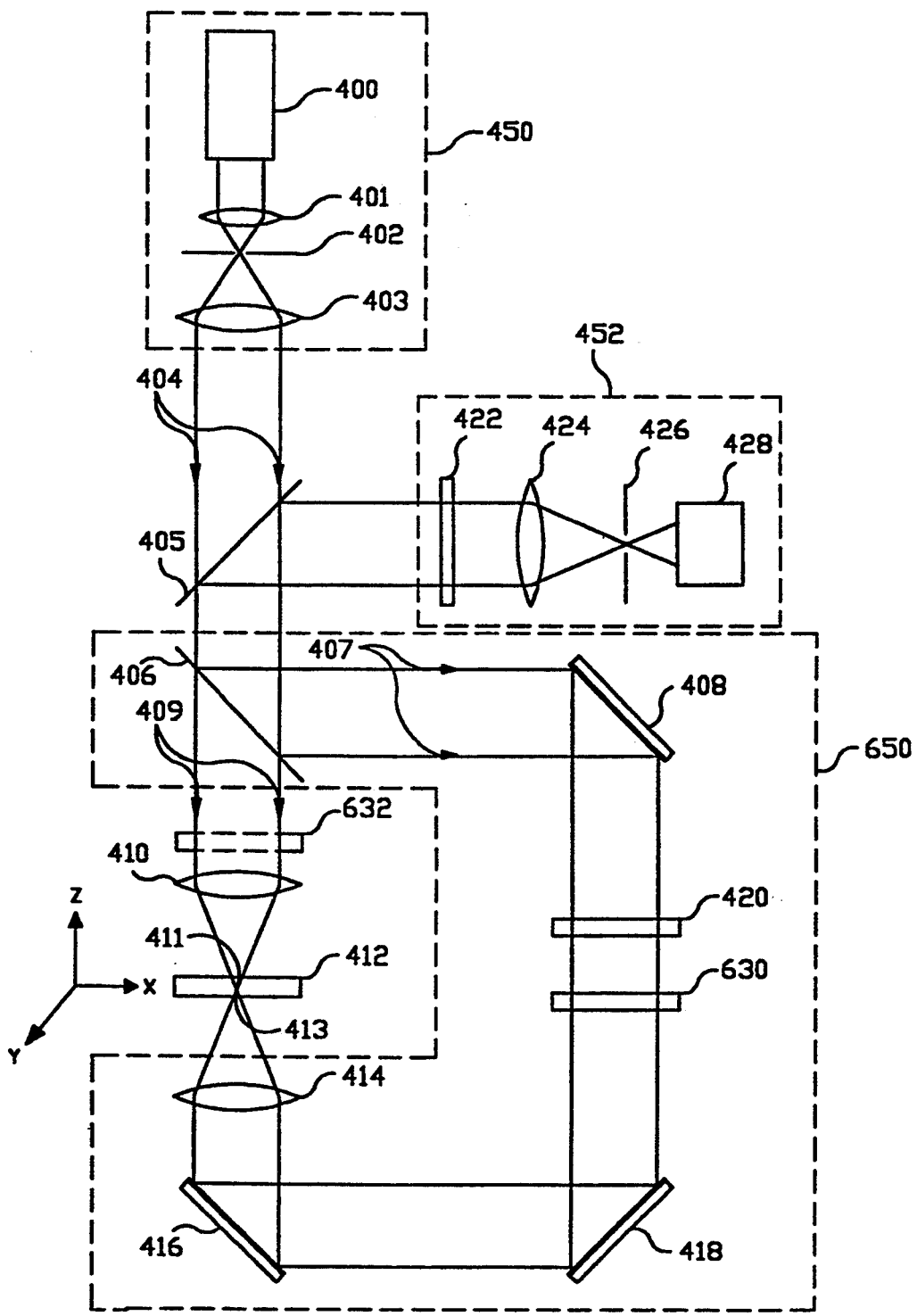
FIG. 6 is a simplified side view of a further embodiment of the present invention, an infinity-corrected scanning optical transmission and reflection microscope in which analyzers are used to select separately each of four imaging modes of the microscope.

A further embodiment of the invention is shown in FIG. 6. This embodiment is the same as that shown in FIG. 4, with the addition of analyzer 630, which is shown just below half-wave plate 420 (several other positions are possible). If analyzer 630 has its polarization axis parallel to that of the original polarized light beam 404 entering the microscope, then light beam 409 after transmission through specimen 412 passes through analyzer 630, has its polarization rotated 90 degrees by half-wave plate 420, and continues through the microscope to enter detection arm 452. At the same time, light beam 407 which is traveling clockwise around the transmission arm 650 has its polarization rotated 90 degrees by half-wave plate 420 before it reaches analyzer 630, and light beam 407 is not transmitted by analyzer 630. Analyzer 422 can then be used to select either transmitted light that enters specimen 412 from above, or light reflected from the top of specimen 412. If analyzer 630 is now rotated so that its polarization axis is perpendicular to that of light beam 404 entering the microscope, analyzer 422 then selects transmitted light that entered specimen 412 from below. When analyzer 422 is then rotated by 90 degrees, it selects reflected light from both sides of specimen 412. If a third analyzer 632 is placed just above objective lens 410 with its polarization axis perpendicular to that of incoming light beam 404, it stops light beam 409 from entering objective lens 410, and thus stops the reflected-light signal from above, without interfering with either the transmitted-light or reflected-light signals originating from light beam 407 that entered specimen 412 from below. The additional advantage of the embodiment described in this paragraph is that it allows each of the four returning beams to be detected separately, whereas in the previous embodiments, either both reflected beams or both transmitted beams reached detector 428 at the same time, and interference effects could change the measured image. By comparing results from the single beam case (as just described) and the two-beam case with analyzers 630 and 632 removed, the interference effects can be determined, and this may be a useful contrast mechanism. In addition, this allows the operator to choose a beam from the top when imaging the top half of the specimen, or a beam from the bottom when imaging the bottom half of the specimen, thereby reducing the effect of spherical abberation on the image.

Figure 1:
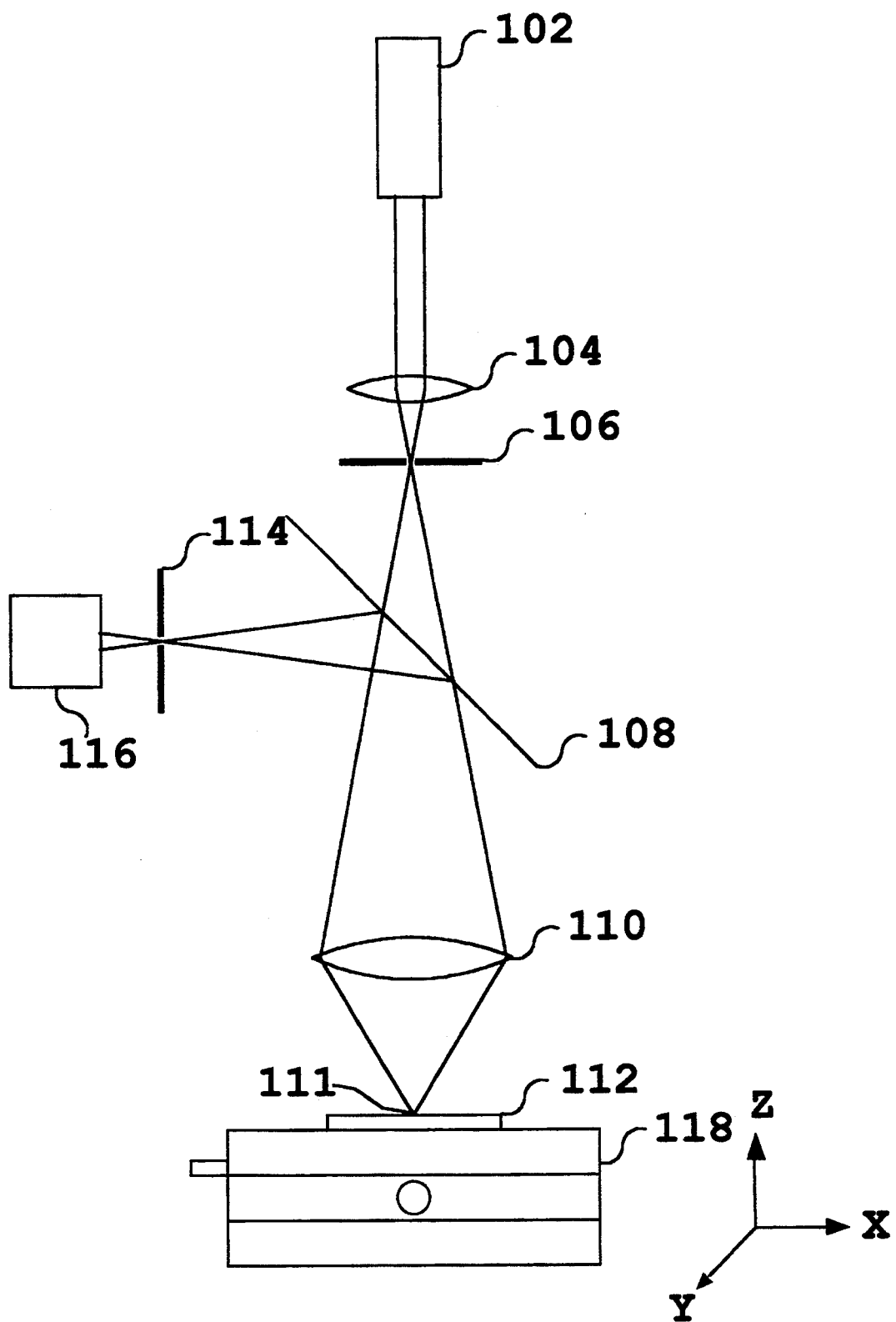
FIG. 1 is a simplified side view of a scanning stage confocal reflection microscope of the prior art.
Figure 2:
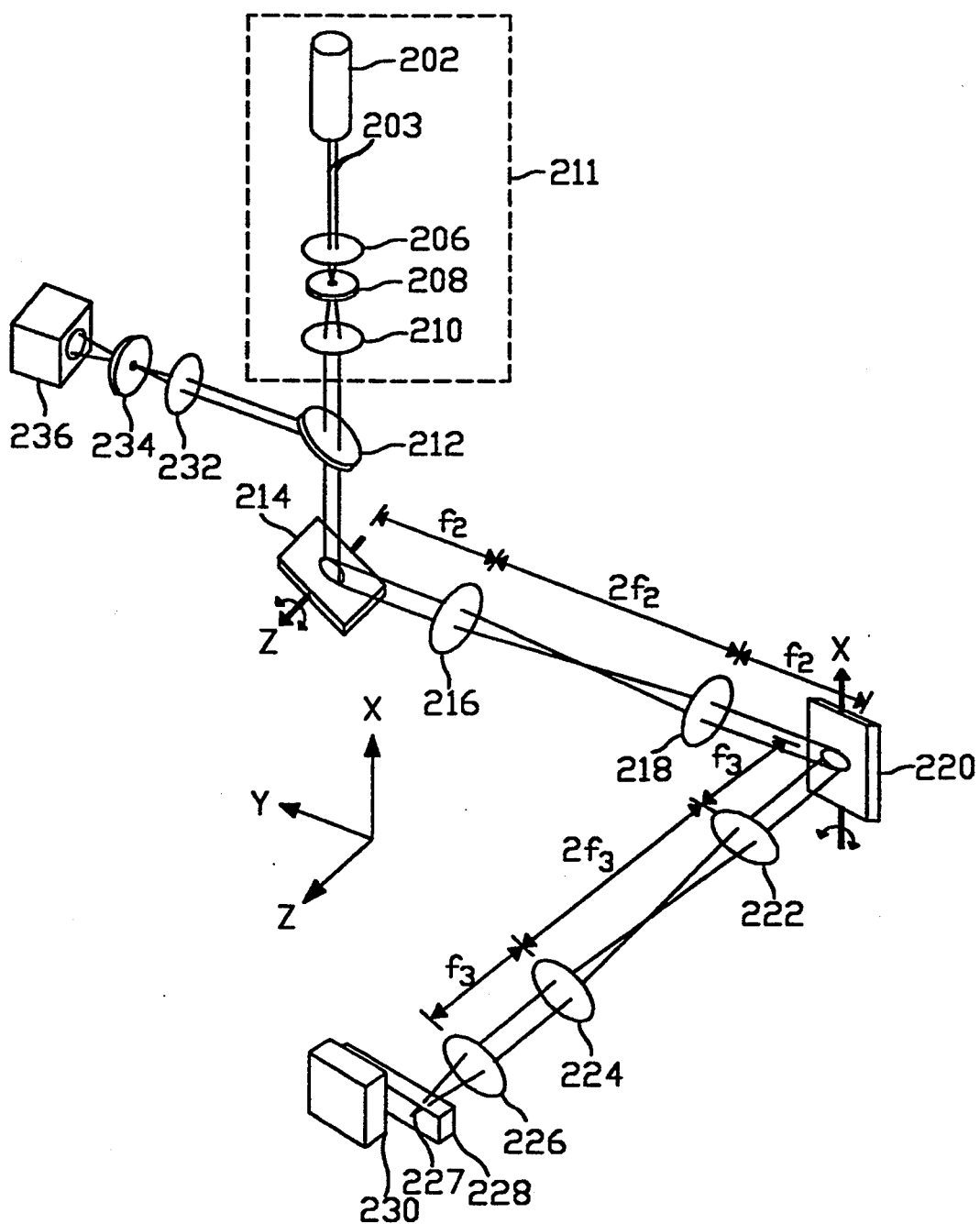
FIG. 2 is a simplified perspective view of an infinity-corrected scanning beam confocal laser reflection microscope of the prior art.
Figure 3:
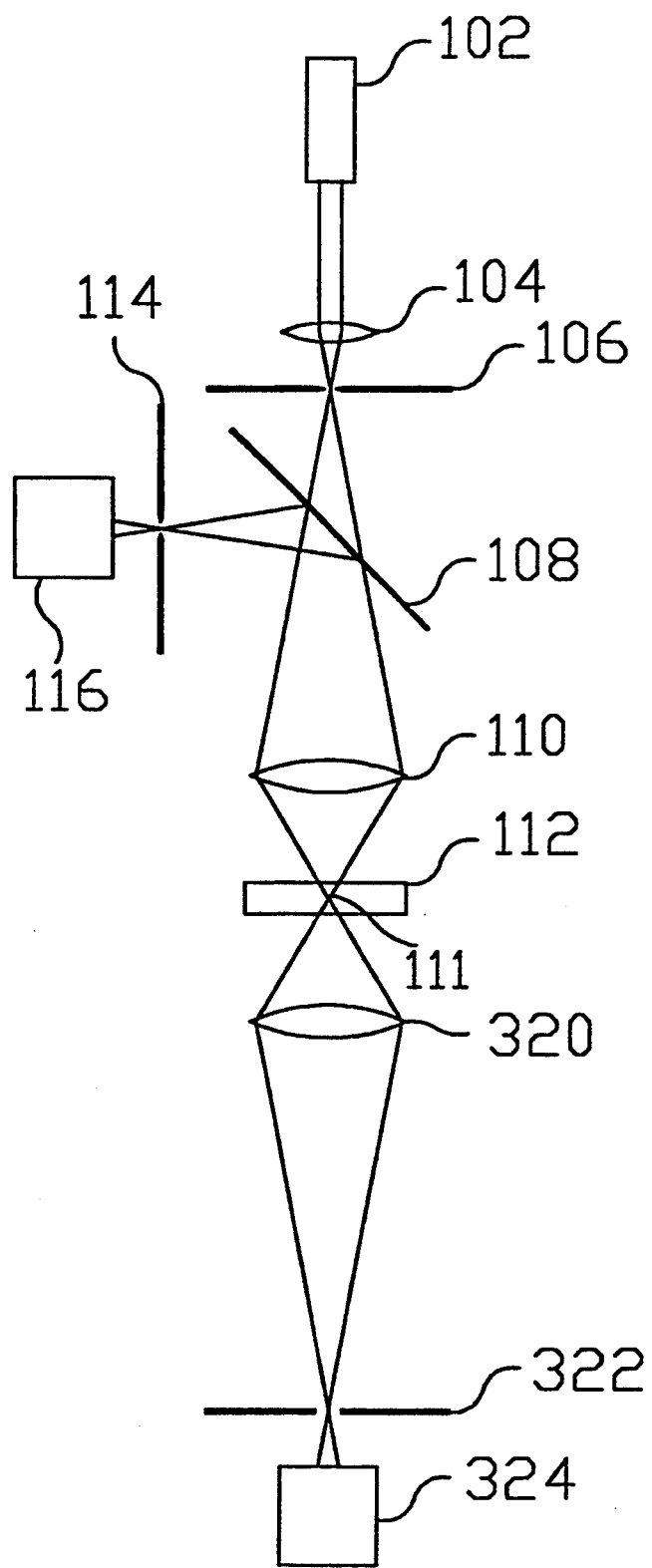
FIG. 3 is a simplified side view of a confocal scanning stage reflection/transmission microscope of the prior art.
Figure 7:
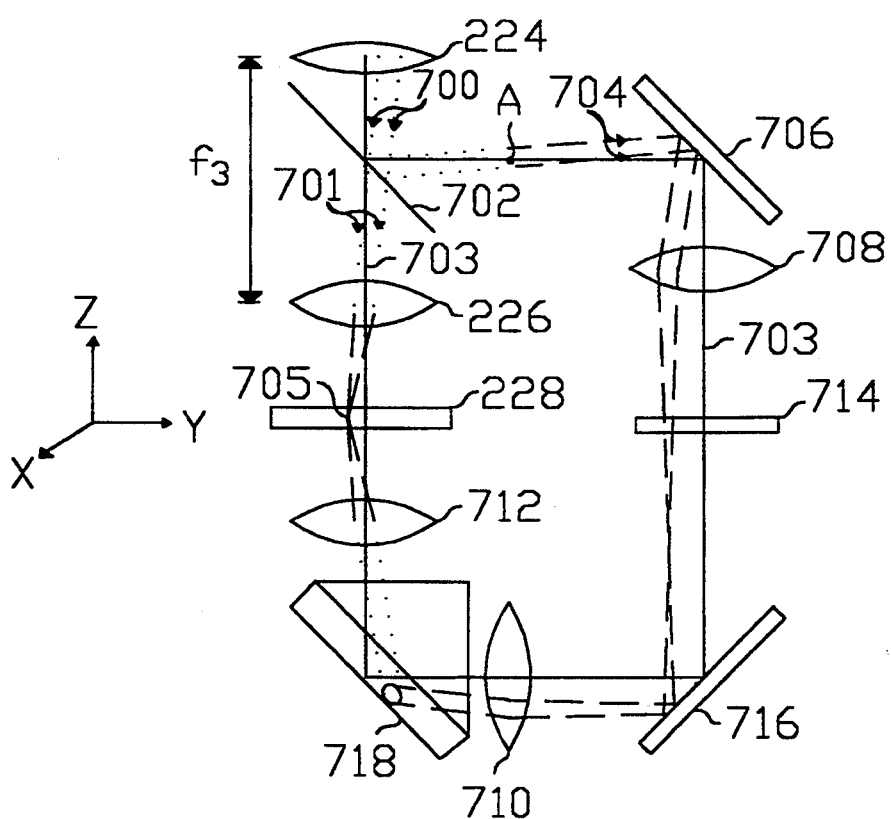
FIG. 7 is a simplified side view of one embodiment of the objective lens and transmission arm assembly of an infinity-corrected confocal scanning beam laser transmission and reflection microscope.

The techniques described above to make a scanning stage transmission and reflection laser microscope can be extended to make a scanning beam system. Here the challenge is to design an optical system that divides the incoming laser beam into two parts just before it enters objective lens 226 of FIG. 2, and steers one part of the incoming beam around the specimen to enter a second objective lens below the specimen at exactly the correct angle so that the focal spots from the two lenses remain coincident as the scan proceeds. In addition, it must be possible to move the two objective lenses closer together or farther apart to compensate for the change of optical path length with sample thickness. One embodiment of such a beam-steering arrangement (or transmission arm) is shown in FIG. 7. In this diagram, lenses 224 and 226 denote the same lenses as they did in FIG. 2. In FIG. 7, dashed lines represent a beam above the plane of the diagram, and dotted lines represent a beam that is below the plane of the diagram. The light beam 700 has already passed through the scan system of the microscope shown in FIG. 2, and is shown in FIG. 7 approaching lens 226 as a parallel beam (light beam 701) that is below the plane of the diagram to the right of optic axis 703 (solid line), and is traveling upward toward the plane of the diagram and to the left to enter first objective lens 226 just as light beam 700 crosses optic axis 703 Objective lens 226 focuses this incoming parallel beam to a focal spot 705 at the position of specimen 228. Part of incoming light beam 700 is reflected by beamsplitter 702 (light beam 704) toward mirror 706, and passes through the optic axis at A, a distance of f3 from lens 224, measured along the optic axis. On the diagram, the dots become dashes at this position. The beam is then reflected by mirror 706 toward lens 708. The lenses 708 and 710 have the same focal length (f4); lens 708 is placed a distance equal to its focal length (f4) from the point A where the beam crossed the optic axis, and a distance equal to twice its focal length from lens 710, which is a distance equal to its focal length (f4) in front of second objective lens 712. All of these distances are measured along the optic axis 703 of the transmission arm of the microscope. After the beam passes through lens 708, it passes through halfwave plate 714 which rotates its polarization by 90 degrees. It is then reflected toward lens 710 by mirror 716. Lens 710 converts the diverging beam into a parallel beam and bends it toward the optic axis. It then passes through roof prism 718 which reflects the beam towards second objective lens 712 and also reverts the beam (moving it from above the plane of the diagram to below the plane). It enters second objective lens 712 at the axis, and is focused by objective lens 712 to exactly the same focal point 705 in specimen 228 as the focal point of the beam entering specimen 228 from the top, coming through objective lens 226. The total optical path length along the axis, measured from the position of lens 224 to second objective lens 712 around the transmission arm is f3+f4+2f4+f4=f3+4f4. Other optical arrangements are possible. For example, the position of roof prism 718 can be exchanged with the position of either mirror 706 or mirror 716. Also, other combinations of optical elements are possible. For example, if roof prism 718 is replaced by a mirror at the same position, a reversion prism can be placed in the transmission arm to revert the beam. One possible position for the reversion prism is between mirror 716 and half-wave plate 714. The focal length of lens 708 and lens 710 is chosen to provide enough distance around the beam-steering arm for placement of optical components, and to allow axial focus adjustment of second objective lens 712 to allow for different specimen thicknesses. If objective lens 712 is moved to change focus, the other components in the transmission arm must be moved in such a way as to maintain the distances between second objective lens 712 and lens 710, lens 710 and lens 708, and lens 708 and objective lens 226, measured along the axis. In this embodiment, the specimen is mounted on a stage (not shown) that can be moved in the focus direction (toward or away from objective lens 226) after each raster scan is complete, in order to change the scan plane in the specimen.

Where the illumination source is substantially monochromatic, a rejection filter can be used with the system of FIG. 7 as previously described in relation to FIG. 4.

Figure 8:
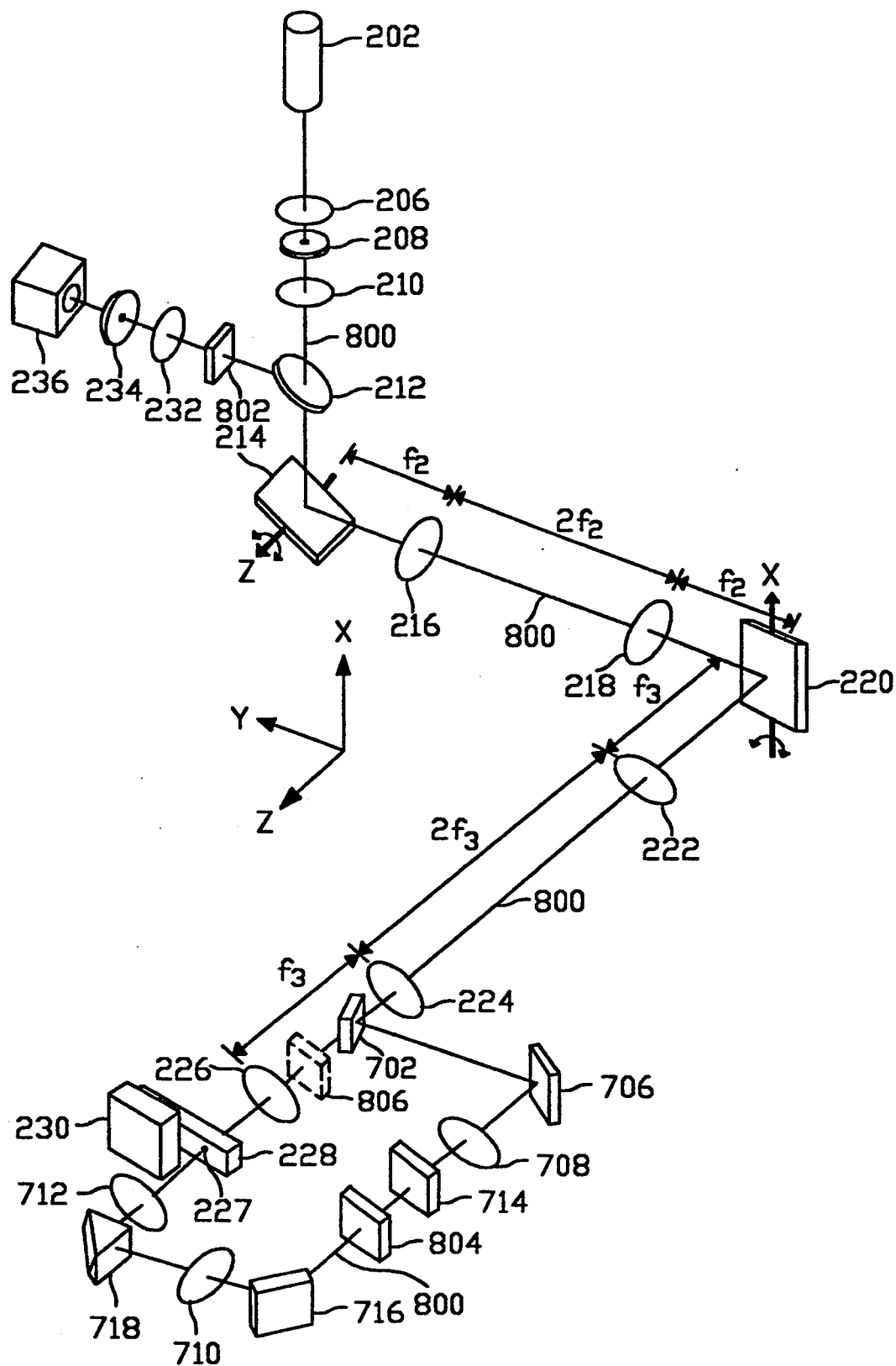
FIG. 8 is a simplified perspective view of the preferred embodiment of the present invention, an infinity-corrected confocal scanning beam optical transmission and reflection microscope.

FIG. 8 shows the preferred embodiment of the transmission/reflection confocal microscope incorporating the transmission arm described in FIG. 7. If light source 202 is polarized, analyzer 804 when combined with half-wave plate 714 allows the operator to select light traveling either clockwise or counterclockwise around the transmission arm, and when used in conjunction with analyzer 802 at the entrance of the detection arm in front of the detector and analyzer 806 above objective lens 226, any of four imaging modes can be selected separately, exactly as described for the scanning-stage embodiment shown in FIG. 6. If analyzer 806 and analyzer 804 are both rotated so their polarization direction is parallel to the polarization of the incoming light beam, then analyzer 802 passes light reflected from the top of specimen 228 when it's polarization is parallel to the polarization of the light beam, and it passes light transmitted from top to bottom through specimen 228 (in the direction from lens 226 toward lens 712) when it's polarization is perpendicular to that of the incoming light beam. If the polarization directions of analyzer 806 and analyzer 804 are both rotated by 90 degrees (to a position perpendicular to the polarization of the incoming light beam) then analyzer 802 can be used to select either light reflected from the bottom of specimen 228 or light transmitted upwards through specimen 228 (in the direction from lens 712 towards lens 226).

Many other optical combinations are possible. For example, if the microscope of FIG. 8 will be used only in a reflection mode, then analyzers 802, 806, and 804 and half-wave plate 714 can be removed. Then reflection from the top can be chosen by blocking off the beam traveling from beamsplitter 702 toward mirror 706, or reflection from the bottom can be chosen by blocking off the beam traveling from beamsplitter 702 towards objective lens 226.

Figure 9:
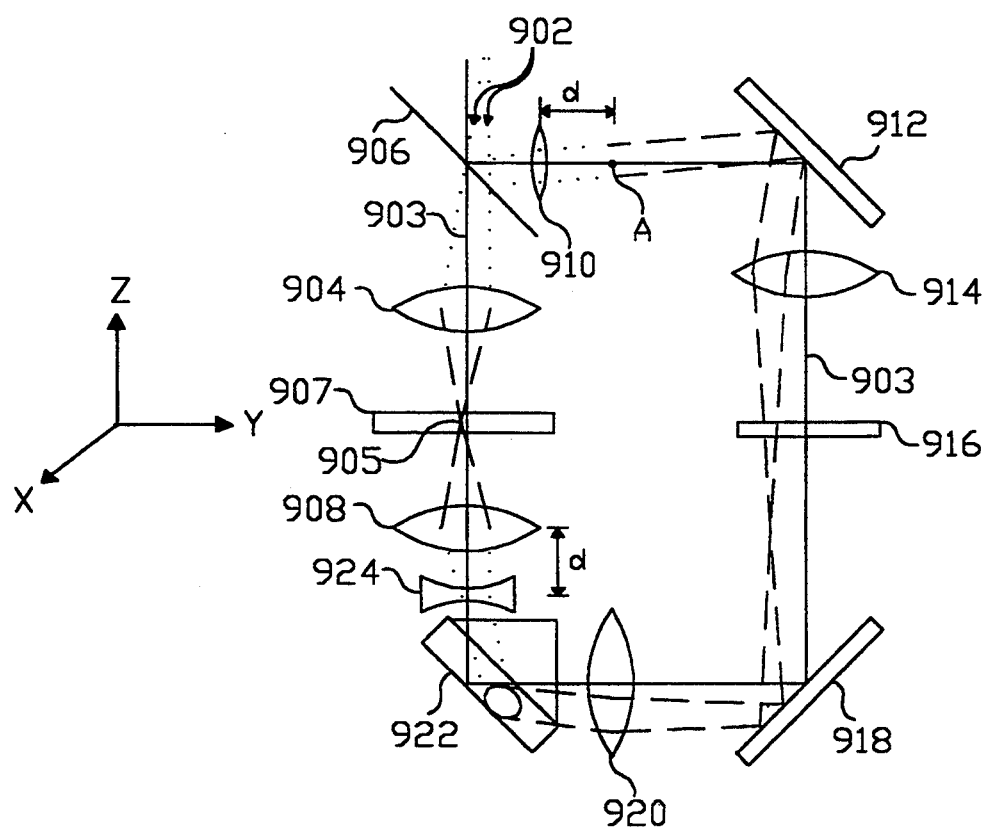
FIG. 9 is a simplified side view of one embodiment of the objective lens and transmission arm assembly of a non-infinity-corrected confocal scanning beam optical transmission and reflection microscope.

The transmission arm shown in FIG. 7 is designed for an infinity-corrected scanning beam microscope, and must be changed to suit a non-infinity-corrected scanning beam microscope. One embodiment of the transmission arm for a non-infinity-corrected scanning beam transmitted-light and reflected-light confocal microscope is shown in FIG. 9. In a non-infinity-corrected confocal scanning optical microscope, the polarized light beam 902 has already passed through the microscope scan optics (not shown), and approaches objective lens 904 expanding from a point above the objective lens. Beamsplitter 906 is inserted above objective lens 904 to reflect part of the incoming beam into the transmission arm that will steer the beam around specimen 907 to enter a second objective lens 908 which is identical to and confocal with objective lens 904. The lens 910 is inserted into the expanding partially-reflected beam before it has expanded to the diameter it will reach when entering second objective lens 908. The focal length of lens 910 is chosen to collimate the expanding beam. The collimated beam passes through the beam-steering optics as before, and passes through negative lens 924, which has the same (but negative) focal length as lens 910. Negative lens 924 is placed a distance d in front of objective lens 904 so the expanding beam entering second objective lens 908 has the same diameter as that entering objective lens 904. Both objective lenses 904 and 908 are focused at the same focal spot 905 inside specimen 907. If this transmission arm is used to enable transmitted-light imaging in a Nipkow Disk microscope, half-wave plate 916 should be removed, since some versions of these microscopes use a half-wave plate to reduce reflections in the optical system.

While the description and drawings describe a confocal microscope or mapping system, the same systems using a non-confocal microscope or mapping system can be utilized. A non-confocal microscope or mapping system simply has a large focal point relative to a confocal microscope or mapping system.

From the foregoing description it will be appreciated that the invention makes available a scanning optical transmission and reflection microscope with many advantages over the prior art. These advantages were listed as a series of objects of the invention. All of the objects have been achieved. An additional advantage is that all the images from the different imaging modes of the microscope are in perfect registration.

Having described preferred embodiments of the new and improved reflection/transmission scanning optical microscope or mapping system constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

I claim:

1. A confocal scanning beam optical transmission, reflection and luminescence microscope comprising means for supporting a specimen to be observed and measured, an illumination source producing a light beam directed along an optical path toward said specimen, a first microscope objective in said optical path for focusing said light beam to produce an illuminated spot in a prescribed specimen plane, means for scanning the light beam to move said focused illuminated spot in a predetermined scan pattern on said specimen plane, transmission arm whereby the light beam transmitted through said specimen is collected, and said transmitted light beam is injected back into said optical path above said microscope objective and between said microscopy objective and said scanning means so that the injected light beam is exactly parallel with, coaxial with and travelling in the same direction as the reflected light beam from the specimen that has been collected by said microscope objective, means for confocal detection of said reflected and transmitted light.

2. The microscope of claim 1 wherein said transmission arm comprises a second microscope objective placed on the opposite side of said specimen from said first microscope objective, said second microscope objective being coaxial with said first microscope objective, at such a distance that the focal planes of the two microscope objectives coincide, beamsplitter placed between said first microscope objective and said scanning means, oriented at 45 degrees to the optic axis, optical subassembly comprising three reflection means, two focusing means and reversion means, arranged to inject said transmitted light beam back into said optical path utilizing said beamsplitter, where the specimen is illuminated from above and from below, and the means for confocal detection is a confocal detector which receives both reflected-light and transmitted-light beams resulting from each direction of illumination of the specimen.

3. The microscope of claim 2 wherein said illumination source is a polarized illumination source, and further comprising an analyzer in a detection arm of the microscope in front of a focusing lens, a half-wave plate in said optical subassembly in said transmission arm whereby either reflected-light or transmitted-light imaging can be selected by rotating said analyzer.

4. The microscope of claim 3 further comprising a second .analyzer, placed in said optical subassembly in said transmission arm, whereby in conjunction with said half-wave plate, either light traveling clockwise or counterclockwise around said transmission arm can be selected, a third analyzer, placed between said beamsplitter and said first microscope objective, whereby, in conjunction with said analyzer in the detection arm of the microscope, any of four modes of imaging the specimen can be selected: reflected light from above, reflected light from below, transmitted light from above, or transmitted light from below.

5. Tho microscope of claim 2 wherein said illumination source is substantially monochromatic, and further comprising a rejection filter at the wavelength of said illumination source placed at the entrance of a detection arm, whereby transmitted and reflected light beams are blocked from said confocal detector, whereby the light detected by said confocal detector is substantially due to fluorescence or photoluminescence emission from the specimen at the position of said illuminated spot.

6. The microscope of claim 2 wherein said illumination source is substantially monochromatic, and said beamsplitter in said transmission arm is a dichroic beamsplitter that passes light at the source wavelength, and reflects light of longer wavelengths, and wherein said second microscope objective Is focused at the correct focal distance for the longer photoluminescence or fluorescence wavelengths, and further comprising a rejection filter at the wavelength of said illumination source placed at the entrance of a detection arm, whereby light having the same wavelength as the source is blocked from said confocal detector, whereby true confocal imaging of the longer photoluminescence or fluorescences wavelengths is achieved.

7. A non-confocal scanning light beam optical transmission, reflection and luminescence microscope comprising means for supporting a specimen to be observed and measured, an illumination source producing a light beam directed along an optical path toward said specimen, a first microscope objective in said optical path for focusing said light beam to produce an illuminated spot in a prescribed specimen plane, means for scanning the light beam to move said focused illuminated spot in a predetermined scan pattern on said specimen plane, transmission arm whereby the light beam transmitted through said specimen is collected, and said transmitted light beam is injected back into said optical path above said microscope objective and between said microscope objective and said scanning means so that the injected light beam is exactly parallel with, coaxial with and travelling in the same direction as the reflected light beam from the specimen that has been collected by said microscope objective, means for detection of said reflected and transmitted light.

8. The microscope of claim 7 wherein said transmission arm comprises a second microscope objective placed on the opposite side of said specimen from said first microscope objective, said second microscope objective being, coaxial with said first microscope objective, at such a distance that the focal planes of the two microscope objectives coincide, beamsplitter placed between said first micro,cope objective and said scanning means, oriented at 45 degrees to the optic axis, optical subassembly comprising three reflection means, two focusing means and reversion means, arranged to inject said transmitted light beam back into said optical path utilizing said beamsplitter, whereby the specimen is illuminated from above and from below, and the means for detection is a detector that receive: both reflected-light and transmitted-light beams resulting from each direction of illumination of the specimen.

9. The microscope of claim 8 wherein said illumination source is a polarized illumination source, and further comprising an analyzer in a detection arm of the microscope in front of a focusing lens, a half-wave plate in said optical subassembly in said transmission arm whereby either reflected-light or transmitted-light imaging can be selected by rotating said analyzer.

10. The microscope of claim 9 further comprising a second analyzer, placed in said optical subassembly in said transmission arm, whereby in conjunction with said half-wave plate, either light traveling clockwise of counterclockwise around said transmission arm can be selected, a third analyzer, placed between said beamsplitter and said first microscope objective, whereby, in conjunction with said analyzer In the detection arm of the microscope, any of four modes of imaging the specimen can be selected: reflected light from above, reflected light from below, transmitted light from above, or transmitted light from below.

11. The microscope of claim 7 wherein said illumination source is substantially monochromatic, said means for detection is a detector that receives both reflected-light and transmitted-light beams resulting from each direction of illumination of said specimen, and further comprising a rejection filter at the wavelength of said illumination source placed at the entrance of a detection arm, whereby transmitted and reflected light beams are blocked from said detector, whereby the light detected by said detector is substantially due to fluorescence or photoluminescence emission from the specimen at the position of said illuminated spot.

12. The microscope of claim 8 wherein said illumination source is substantially monochromatic, and said beamsplitter in said transmission arm is a dichroic beamsplitter that passes light at the source wavelength, and reflects light of longer wavelengths, and wherein said second microscope objective is focused at the correct focal distance for the longer photoluminescence or fluorescence wavelengths, and further comprising a rejection filter at the wavelength of said illumination source placed at the entrance of a detection arm, whereby light having the same wavelength as the source is blocked from said detector.

13. A confocal scanning stage optical transmission, reflection and luminescence microscope or mapping system comprising means for supporting a specimen to be observed and measured, an illumination source producing a light beam directed along an optical path toward said specimen, a first microscope objective in said optical path for focusing said light beam to produce an illuminated spot in a prescribed specimen plane, means for translating said specimen in a predetermined scan pattern whereby said specimen moves relative to a stationary illuminated spot, said illuminated spot being confined to said specimen plane, transmission arm whereby the light beams transmitted through said specimen is collected, and said transmitted light beam is injected back into said optical path above said microscope objective so that the injected light beam is exactly parallel with, coaxial with and travelling in the came direction as the reflected light beams from the specimen that has been collected by said microscope objective, means for confocal detection of said reflected and transmitted light.

14. The microscope or mapping system of claim 13 wherein said transmission arm comprises a second microscope objective placed on the opposite side of said specimen from said first microscope objective, said second microscope objective being coaxial with said first microscope objective, at such a distance that the focal planes of the two microscope objectives coincide, beamsplitter placed above said first microscope objective, oriented at 45 degrees to the optic axis, optical subassembly, comprising three reflection means, arranged to inject said transmitted light beam back into said optical path utilizing laid beamsplitter, whereby the specimen at illuminated from above and from below, and the means for confocal detection is a confocal detector that receives both reflected-light and transmitted-light beams resulting from each direction of illumination of the specimen.

15. The microscope or mapping system of claim 14 wherein said illumination source is a polarized illumination source, and further comprising an analyzer an a detection are, of the microscope in front of a focusing lens, a half-wave plate in said optical subassembly in said transmission arm whereby either reflected-light or transmitted-light imaging can be selected by rotating said analyzer.

16. The microscope or mapping system of claim 15 further comprising a second analyzer, placed in said optical subassembly in said transmission arm, whereby in conjunction with said half-wave plate, either light traveling clockwise or counterclockwise around said transmission arm can be selected, a third analyzer, placed between said beamsplitter and said first microscope objective, whereby, in conjunction with said analyzer in the detection arm of the microscope, any of four modes of imaging the specimen can be selected: reflected light from above, reflected light from below, transmitted light from above, or transmitted light from below.

17. The microscope or mapping system of claim 14 wherein said illumination source is substantially monochromatic, and further comprising a rejection filter at the wavelength of said illumination source placed at the entrance of a detection arm, whereby transmitted and reflected light beams are blocked from said confocal detector, whereby the light detected by said confocal detector is substantially due to fluorescence or photoluminescence emission from the specimen at the position of said illuminated spot.

18. The microscope or mapping system of claim 14 wherein said illumination source is substantially monochromatic, and said beamsplitter in said transmission arm is a dichroic beamsplitter that passes light at the source wavelength, and reflects light of longer wavelengths, and wherein said second microscope objective is focused at the correct focal distance for the longer photoluminescence or fluorescence wavelengths, and further comprising a rejection filter at the wavelength of said illumination source placed at the entrance of a detection arm, whereby light having the came wavelength as the source is blocked from said confocal detector, whereby true confocal imaging of the longer photoluminescence or fluorescence wavelengths is achieved.

19. A non-confocal scanning stage optical transmission, reflection and luminescence microscope or mapping system comprising means for supporting a specimen be observed and measured, an illumination source producing a light beam directed along an optical path toward said specimen, a first microscope objective in said optical path fur focusing said light beam to produce an illuminated spot in a prescribed specimen plane, means for transmitting said specimen in a predetermined scan pattern whereby said specimen moves relative to a stationary illuminated spot, said illuminated spot being confined to said specimen plane, transmission arm whereby the light beam transmitted through said specimen is collected, and said transmitted light beam Is injected back into the said optical path above said microscope objective so that the injected light beam exactly parallel with, coaxial with and travelling in the same direction as the reflected light beam from the specimen that has been collected by said microscope objective, means for detection of said reflected and transmitted light.

20. The microscope or mapping system, of claim 19 wherein said transmission arm comprises a second microscope objective placed on the opposite side of said specimen from said first microscope objective, said second microscope objective being coaxial with said first microscope objective, at such a distance that the focal planes of the two microscope objective coincide, beamsplitter placed above said first microscope objective, oriented at 45 degrees to the optic axis, optical subassembly comprising three reflection means, arranged to inject said transmitted light beam back into said optical path utilizing said beamsplitter, whereby the specimen is illuminated from above and from below, and the means for detection is a detector that receives both reflected-light and transmitted-light beams resulting from each direction of illumination of the specimen.

21. The microscope or mapping system of claim 20 wherein said illumination source is a polarized illumination source, and further comprising an analyzer in a detection arm of the microscope in front of a focusing lens, a half-rave plate In said optical subassembly in said transmission arm wherein either reflected-light or transmitted-light imaging can be selected by rotating said analyzer.

22. The micro,cope or mapping system of claim 21 further comprising a second analyzer, placed in said optical subassembly in said transmission arm, whereby in conjunction with said half-wave plate, either light traveling clockwise or counterclockwise around said transmission arm can be selected, a third analyzer, placed between said beam-splitter and said first microscope objective, whereby, in conjunction with said analyzer in the detection arm of the microscope, any of four modes of imaging the specimen can be selected: reflected light from above, reflected light from below, transmitted light from above, or-transmitted light from below.

23. The microscope or mapping system of claim 20 wherein said illumination source is substantially monochromatic, and further comprising a rejection filter at the wavelength of said illumination source placed at the entrance of a detection arm, whereby transmitted and reflected light beams are blocked from said detector, whereby the light detected by said detector is substantially due to fluorescence or photoluminescence emission from the specimen at the position of said illuminated spot.

24. The microscope or mapping system of claim 20 wherein said illumination source is substantially monochromatic, and said beamsplitter in said transmission arm is a dichroic beamsplitter that passes light at the source wavelength, and reflects light of longer wavelengths, and wherein said second microscope objective is focused at the correct focal distance for the longer photoluminescence or fluorescence wavelengths, and further comprising a rejection filter at the wavelength of said illumination source placed at the entrance of a detection arm, whereby light having the same wavelength as the source is blocked from said detector.

* * * * *